United States Patent
Pan et al.

(10) Patent No.: US 7,332,833 B2
(45) Date of Patent: Feb. 19, 2008

(54) SWITCHING CIRCUIT FOR MASTER-SLAVE FEEDING MODE OF LOW VOLTAGE POWER SUPPLY

(75) Inventors: JunKui Pan, Shanghai (CN); HongBing Cheng, Shanghai (CN); YuJian Qian, Shanghai (CN); Lan Zhang, Shanghai (CN)

(73) Assignee: Alcatel, Paris (FR)

( * ) Notice: Subject to any disclaimer, the term of this patent is extended or adjusted under 35 U.S.C. 154(b) by 480 days.

(21) Appl. No.: 11/002,235

(22) Filed: Dec. 3, 2004

(65) Prior Publication Data
US 2005/0127882 A1   Jun. 16, 2005

(30) Foreign Application Priority Data
Dec. 11, 2003   (CN) .................. 2003 1 0109288

(51) Int. Cl.
*H02J 7/00* (2006.01)
(52) U.S. Cl. ....................................... 307/65
(58) Field of Classification Search .................. 307/65
See application file for complete search history.

(56) References Cited

U.S. PATENT DOCUMENTS

| | | | |
|---|---|---|---|
| 4,812,672 A * | 3/1989 | Cowan et al. ................ 307/64 |
| 5,698,908 A * | 12/1997 | Pollmeier et al. ............. 307/44 |
| 5,939,799 A * | 8/1999 | Weinstein ..................... 307/64 |
| 5,945,816 A | 8/1999 | Marusik |
| 6,522,190 B1 | 2/2003 | Malik et al. |
| 2002/0113494 A1 | 8/2002 | Winick et al. |

OTHER PUBLICATIONS

Patent Abstracts of Japan, vol. 2000, No. 02, Feb. 29, 2000, corresponding to JP 11 308766 A (NEC Fukushima Ltd) dated Nov. 5, 1999.
"Low Voltage Drop, Redundant Power Circuit", IBM Technical Disclosure Bulletin, IBM Corp. New York, US vol. 34, No. 1, Jun. 1991, pp. 227-228, XP00210195.

* cited by examiner

*Primary Examiner*—Robert L. Deberadinis
(74) *Attorney, Agent, or Firm*—Sughrue Mion, PLLC

(57) ABSTRACT

The present invention provides a switching circuit for the master-slave feeding mode of the low voltage power supply. The switching circuit utilizes the active switches as the switching devices, so that it can increase the switching speed, decrease the voltage drop and loss, being suitable to the low voltage circuits, and can judge or determine the master power supply and the back-up power supply, realizing the switching between the master and slave power supplies without interruption. The switching circuit of the invention improves the reliability of the system and has the simple structure and easy operation.

9 Claims, 3 Drawing Sheets

SWITCHING CIRCUIT FOR MASTER-SLAVE FEEDING MODE OF LOW VOLTAGE POWER SUPPLY

TECHNICAL FIELD

The present invention relates to a two-way power supply system, more specifically, to a switching circuit for the master-slave feeding mode of the low voltage power supply.

BACKGROUND ART

Generally, the two-way power supply system is made up of ORing diodes whose schematic diagram is shown in FIG. 1. D1 and D2 are used to isolate two ways power supply (more Oring Diodes are used for multi-way than two), however, because of the forward voltage drop of diode (0.8V for silicon diode, 0.4V for Schottky diode) which is unacceptable for the low voltage power supply circuit, so that the isolation ORing diode is unsuitable to the low voltage circuit. Meanwhile, the master power supply and the slave power supply could not be determined in the case. If the voltages of the two power supplies have a little difference, D1 and D2 would be "on" simultaneously.

In view of the drawback existing in the conventional two-way power supply system, the invention proposes a switching circuit for the master-slave feeding mode of the low voltage power supply.

CONTENTS OF THE INVENTION

The object of the invention is to provide a switching circuit for the master-slave feeding mode of the low voltage system that is suitable to the low voltage circuit and has the simple structure and the easy operation in the case that the switching circuit is used, the master power supply and the slave power supply can be determined. If adopting the master-slave feeding mode, the reliability of the system will enhance.

The switching circuit for the master-slave feeding mode of the low voltage power supply of the invention comprises:
1 Master & Slave input terminals
2 Output terminals
3 Master switch between the master input terminal and the output terminal,
4 Slave switch between the secondary input terminal and the output terminal
5 Input voltage sense RC network
6 Control Device that control "on" or "off" states of the master and secondary switch When master power supply is normal, the Control Device controls the master switch to be "on", the secondary switch to be "off", otherwise the Control Device controls the master switch to be "off", the secondary switch to be "on".

In this circuit, the input voltage sense RC network comprises two resistances (R340 and R342) and a capacitor (C12) wherein one terminal of the resistances (R340 and R342) is grounded, the other terminal is connected to master power supply input terminal, and the capacitor (C12) is parallel with the resistance positioned on the grounded side, the value of the voltage between two resistances (R340 and R342) is the sense voltage.

An auxiliary supply is derived from master and slave through 2 Oring diodes (V8, V13), which supply Control Device and always is in work.

In this switching circuit, the Control Device comprises a dual-comparer and resistors and capacitors.

A reference voltage for a comparer (N3A) comprises two resistances (R341, R343) and a capacitor (C11), these two series resistances (R341, R343) being parallel with the capacitor (C11), one terminal of which is grounded and the other terminal is connected to the common power supply terminal; the other reference voltage for the other comparer (N3B) comprises two resistances (R346, R347), one terminal of which is grounded and the other terminal is connected to the common power supply terminal.

One input terminal of a comparer (N3A) is connected to the output terminal of the a comparer (N3A), the other input terminal is connected to the common connecting point of two series resistances (R341, R343) of the reference voltage, and the output terminal of comparer N3A is connected to one input terminal of the other comparer (N3B) and the Gate of the master switch; the other input terminal of the other comparer (N3B) is connected to a common connecting point of two series resistances (R346, R347) of the other reference voltage, an output terminal of the other comparer (N3B) is connected to the Gate of the slave switch.

The Control Device further comprises two up-pulling resistances (R348, R349) provided between the output terminals of the dual-comparer (N3A, N3B) and the common power supply terminal respectively, and two series resistances (R344, R345) provided between the reference voltage input terminal and the output terminal of one comparer (N3A), being used to set a feedback of the comparer (N3A).

The switching circuit of the invention further comprises two diodes that are parallel with the master switch and the secondary switch. As pass-by paths, those two diodes guarantee the output voltage not to below to a certain level during switch time.

The master switch and the slave switch comprise 2 P-channel MOSFET. As active switches, there have the merit of low voltage drop, programmable and fast. The decrease of voltage drop and power loss improve the reliability of the system when adopt the master-slave feeding mode.

MODE OF CARRYING OUT THE INVENTION

Embodiments of the invention will be further described with reference to the accompanying drawings as follows.

Figure 1:
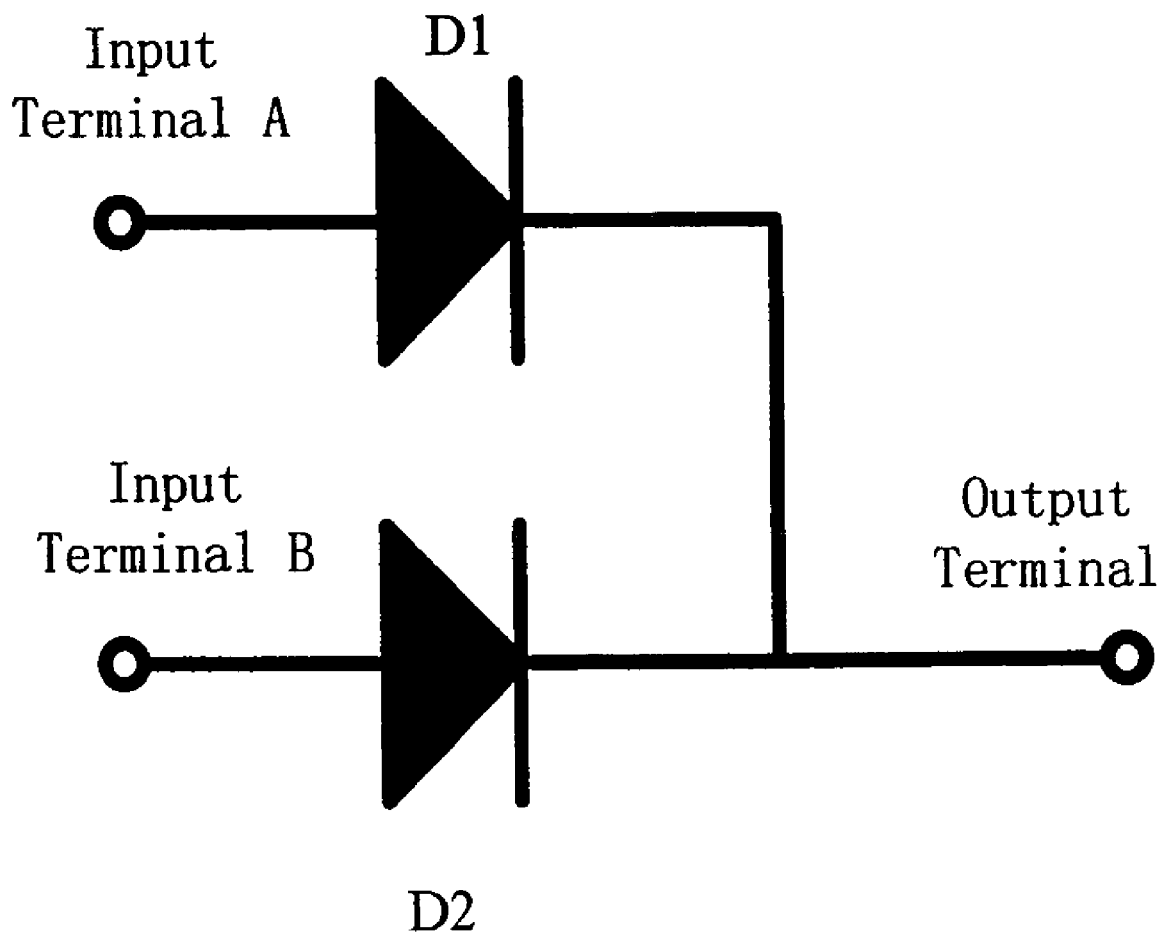
FIG. 1 is a schematic showing a structure of conventional two-way power supply circuit.
Figure 2:
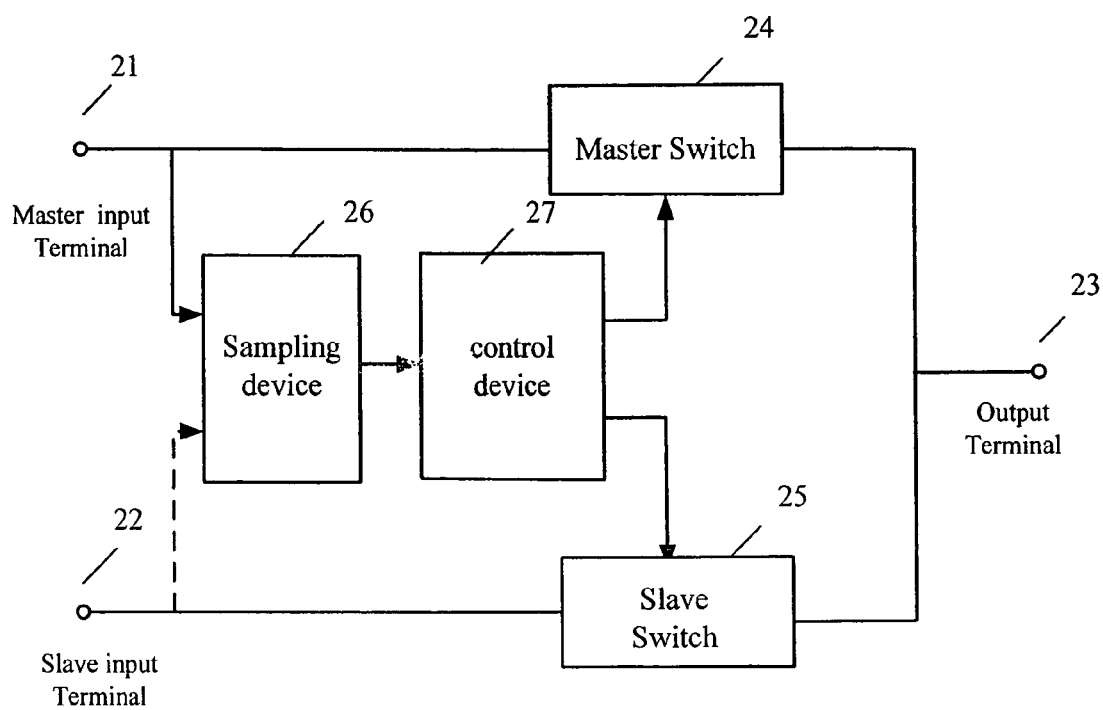
FIG. 2 is a block diagram showing a structure of switching circuit for the master-slave feeding mode of the low voltage power supply of the invention.

FIG. 2 shows a schematic of this master-slave feeding mode of the low voltage power supply. The switching circuit for the master-slave feeding mode of the low voltage power supply comprises by these parts as below: (As shown in FIG. 2)

A master input terminal 21
A secondary power supply input terminal 22
An output terminal 23
A master switch 24 between the master input terminal 21 and the output terminal 23
A slave switch 25 between the slave input terminal 22 and the output terminal 23
Sampling device 26
Control Device 27.

In this switching circuit, master switch 24 and slave switch 25 are the active switches. Sampling device 26 is connected to master input terminal 21 for sense the signals of master power supply input terminal 21.

The Control Device 27 is connected to the output terminal of Sampling device 26, and its output terminal is connected to master switch 24 and slave switch 25 respectively, being used to judge and control the "on" or "off" states of the master and slave switches according to the output of Sampling device 26, that is, when the master power supply is normal, Control Device 27 controls master switch 24 to be "on", slave switch 25 to be "off", otherwise Control Device 27 controls master switch 24 to be "off", slave switch 25 to be "on".

Figure 3:
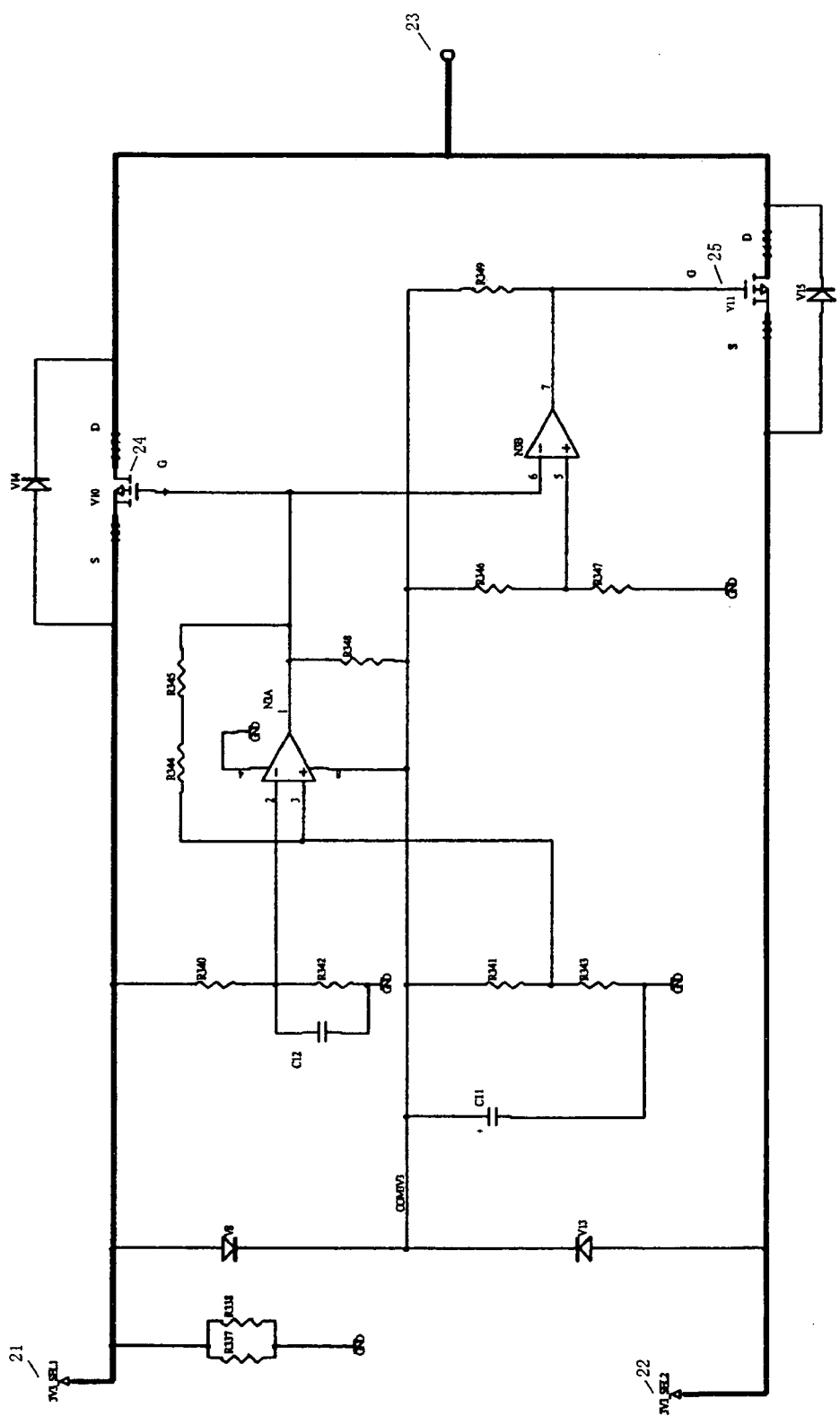
FIG. 3 is a schematic diagram showing a structure of circuit of an embodiment of the invention.

FIG. 3 shows a schematic of the structure of circuit of an embodiment of the invention. As shown in FIG. 3, the embodiment is a switching circuit for two-way master-slave feeding mode suppling 3.3V to a core circuit, wherein 3V3_SEL1 represents the master power supply input at master power supply input terminal 21, 3V3_SEL2 represents the secondary power supply input at secondary power supply input terminal 22.

In this embodiment, V10, V11 are MOSFETs IRF7210, being the active switches. V10 as master switch 24 is provided between master power supply input terminal 21 and output terminal 23; V11 as secondary switch 25 is provided between secondary power supply input terminal 22 and output terminal 23. Low voltage power MOS transistors are used as the active switches to realize the power switching, having the advantages of short response time, small conductive resistance, etc. For example, the switch-on resistance of MOS transistor IRF7210 is only 7 mΩ, the voltage drop against 2 A input current is only 14 mV, or 49 mV against 7 A with the power consumption being only 343 mW. The active switches of the invention are not limited to the low voltage power MOS transistors, other active switches being able to realize the same function are available.

Two by-pass diodes V14, V15 are parallel with active switch V10, V11 respectively. During normal operation these two by-pass diodes V14, V15 are all off because the voltage drop of V14, V15 is far larger than that of V10, V11; only during switching V10 and V11, one of these by-pass diodes positioned on one of two ways, which will become the power feeding way, will be on to maintain the rear stage voltage, and after the active switch of this way is switched to be on, the by-pass diode is restored to be off, because the positive voltage drop of the active switch is far smaller than that of the by-pass one.

In this embodiment, resistances R340, R342 and capacitor C12 constitute Sampling device 26 to sense the voltage of master power supply input terminal 21 or to sense the current of the master power supply input terminal as well. One terminal of series resistances R340 and R342 is grounded and the other terminal is connected to master power supply input terminal 21, capacitor C12 is parallel with R342 positioned on the grounded side, and the voltage of resistance R342 is the output of Sampling device 26. Sampling device 26 can sample the voltage or current signals of both master power supply input terminal 21 and secondary power supply input terminal 22 simultaneously, that is, the sampling circuit for sampling at master power supply input terminal 21 is not changed, the reference voltage circuit of comparer N3A constituted of resistances R341, R343 and capacitor C11 is changed, that is, two series resistances R341, R343 are parallel with capacitor C11, one terminal of which is grounded and the other terminal is connected to secondary power supply input terminal 22 for sampling the voltage signals of secondary power supply input terminal 22, hence, sampling the voltage signals of both master power supply input terminal 21 and secondary power supply input terminal 22 simultaneously is realized.

Two diodes (V8, V13) series in contrary direction constitute the power—supply—introduced and isolating circuit of the switching circuit of the invention, one terminal of which is connected to the master power supply input terminal and the other terminal is connected to the secondary power supply input terminal, and the common connecting point of these two diodes (V8, V13) is the common power supply terminal of judging and controlling device 27, being used to provide the operating voltage to control device 27 and isolate the master input power supply from the secondary input power supply.

As shown in FIG. 3, in the embodiment of the invention, control device 27 comprises a dual-comparer constituted of two comparers N3A, N3B and two reference voltage circuits.

Chip N3 as a controlling device is the dual-comparer LM393D for performing the judgement of the master-slave inputs and the switching control of active switches V10, V11. The logic controlling device LM393D can be used to realize the switching between the master power supply and slave power supply without interruption. Comparers N3A, N3B are two portions of chip N3, which share a common power supply.

Resistances R341, R343 and capacitor C11 constitute a reference voltage circuit for setting a reference voltage for comparer N3A, series resistances R341 and R343 being parallel with capacitor C11, one terminal of which is grounded and the other terminal is connected to a common power supply terminal, and the voltage of resistance R343 is the reference voltage of comparer N3A.

Resistances R346, R347 constitute the other reference voltage circuit for setting the reference voltage for comparer N3B, one terminal of series resistances R346 and R347 being grounded and the other terminal being connected to a common power supply terminal, and the voltage of resistance R347 is the reference voltage of comparer N3B.

The negative terminal of comparer N3A is connected to the output terminal of sampling circuit 26, the positive terminal of the same is connected to the common connecting point of series resistances R341, R343, and the output terminal of the same is connected to the negative terminal of comparer N3B and the controlling terminal of master switch 24 respectively.

The positive terminal of comparer N3B is connected to the common connecting point of series resistances R346, R347, the negative terminal of the same is connected to the output terminal of comparer N3A, and the output terminal of the same is connected to the controlling terminal of secondary switch 25, being used to judge and control the "on" or "off" states of the master switch 24 and secondary switch 25 according to the voltage signal of master power supply input terminal 21. It is the function of comparer N3B to control secondary switch 25 always to be off when master switch 24 is on and to control secondary switch 25 always to be on when master switch 24 is off, making both switches always be in the contrary states.

Control device 27 further comprises two up-pulling resistances R348, R349, which are the up-pulling resistances of comparers N3A, N3B and provided between the output terminals and the operating voltage input terminals of comparers N3A and N3B respectively, being used to make the output of comparers N3A, N3B effective. The up-pulling resistances are necessary because the output of LM393D is an OC gate. The up-pulling resistances can be omitted if other type of operational amplifiers are used as the comparers.

Control device 27 further comprises two series resistances R344, R345 provided between the positive terminal and the output terminal of comparer N3A for setting the feedback of comparer N3A and preventing comparer N3A from being in unstable state.

The switching circuit of the invention further comprises a fictitious load constituted of parallel resistances R337, R338, which is a fictitious load of the master input power supply and used mainly to discharge the capacitor (not shown in FIG. 3) at the input terminal of the master power supply, stabilizing the operating voltage and preventing the judgement of the logic circuit from being influenced by the voltage of this capacitor (not shown).

When existing 3V3_SEL1, the potential of pin 2 of N3A is higher than that of pin 3 and the potential of pin 1 of N3A is low, so that N3A makes V10 on and N3B makes V11 off, in this time, the master power supply feeds the power.

When existing 3V3_SEL2 rather than 3V3_SEL1, the potential of pin 2 of N3A is lower than that of pin 3, the potential of pin 1 of N3A is high and the potential of pin 7 of N3B is low, so that N3A makes V10 off and N3B makes V11 on, in this time, the secondary power supply feeds the power.

The invention is also suitable to other low voltage circuits, which supply by +1.8V, 5V, 12V, etc.

The invention claimed is:

1. A switching circuit for a master-slave feeding mode of the low voltage power supply, wherein said switching circuit comprising:
    a master power supply input terminal, a secondary power supply input terminal, an output terminal;
    a master switch between master input terminal and output terminal, a secondary switch between slave power supply input terminal and output terminal;
    a sampling device for sampling signals from said master input terminal and slave input terminal;
    a control device for judging and controlling "on" or "off" states of said master and slave switches according to output of said sampling device, wherein when power supply input at the master power supply input terminal is normal, said control device controls the master switch to be "on", and the secondary switch to be "off"; and when said power supply input at the master power supply input terminal is not normal said control device controls the master switch to be "off", and the secondary switch to be "on",
    wherein said control device comprises a dual-comparer constituted by two comparers, and
    an output terminal of a first comparer is connected to one of at least two input terminals of a second comparer.

2. The switching circuit according to claim 1, wherein said sampling device comprises two resistances in series and a capacitor, wherein one terminal of said two resistances in series is grounded and the other terminal is connected to said master power supply input terminal, and said capacitor is parallel with the resistance positioned on the grounded side, a voltage between two resistances is the output of said sampling device.

3. The switching circuit according to claim 1, wherein said switching circuit further comprises a power-supply-introduced and isolating circuit for providing an operating voltage to said control device and isolating said master power supply from said secondary power supply, said power-supply-produced and isolating circuit is constituted by two diodes in series in contrary direction, one terminal of which is connected to said master power supply input terminal and the other terminal is connected to said secondary power supply input terminal, and a common connecting point of these two diodes is a common power supply terminal of said control device.

4. The switching circuit according to claim 3, wherein said control device further comprises two reference voltage circuits;
    a first reference voltage circuit for setting a reference voltage for the first comparer comprises two resistances in series and a capacitor, said two series resistances being parallel with the capacitor, one terminal of which is grounded and the other terminal is connected to said common power supply terminal;
    a second reference voltage circuit for setting a reference voltage for the second comparer comprises two resistances in series, one terminal of which is grounded and the other terminal is connected to said common power supply terminal; and
    one of at least two input terminals of said first comparer is connected to the output terminal of said sampling device, the other input terminal is connected to a common connecting point of the two series resistances of the first reference voltage circuit and the output terminal of the first comparer is further connected to the controlling terminal of master switch; the other input terminal of said the second comparer is connected to a common connecting point of two series resistances of the ether second reference voltage circuit, an output terminal of the second comparer is connected to the controlling terminal of said secondary switch.

5. The switching circuit according to claim 4, wherein said control device further comprises two up-pulling resistances provided between the output terminals of said dual-comparer and said common power supply terminal respectively.

6. The switching circuit according to claim 4, wherein said control device further comprises two series resistances provided between the reference voltage input terminal and the output terminal of said first comparer, being used to set a feedback of said first comparer.

7. The switching circuit according to claim 1, wherein said switching circuit further comprises two diodes which are parallel with the master switch and the secondary switch respectively and used to maintain a rear stage voltage during the switching of the master switch and the secondary switch.

8. The switching circuit according to claim 1, wherein said switching circuit further comprises a fictitious load comprising two parallel resistances, one terminal of which is grounded and the other terminal is connected to the master power supply input terminal, being used to discharge the capacitor at the master power supply input terminal to stabilize the operating voltage of the switching circuit.

9. The switching circuit according to claim 1, wherein said master switch and said secondary switch are comprise MOSFET transistors.

* * * * *